United States Patent Office 3,196,266
Patented July 20, 1965

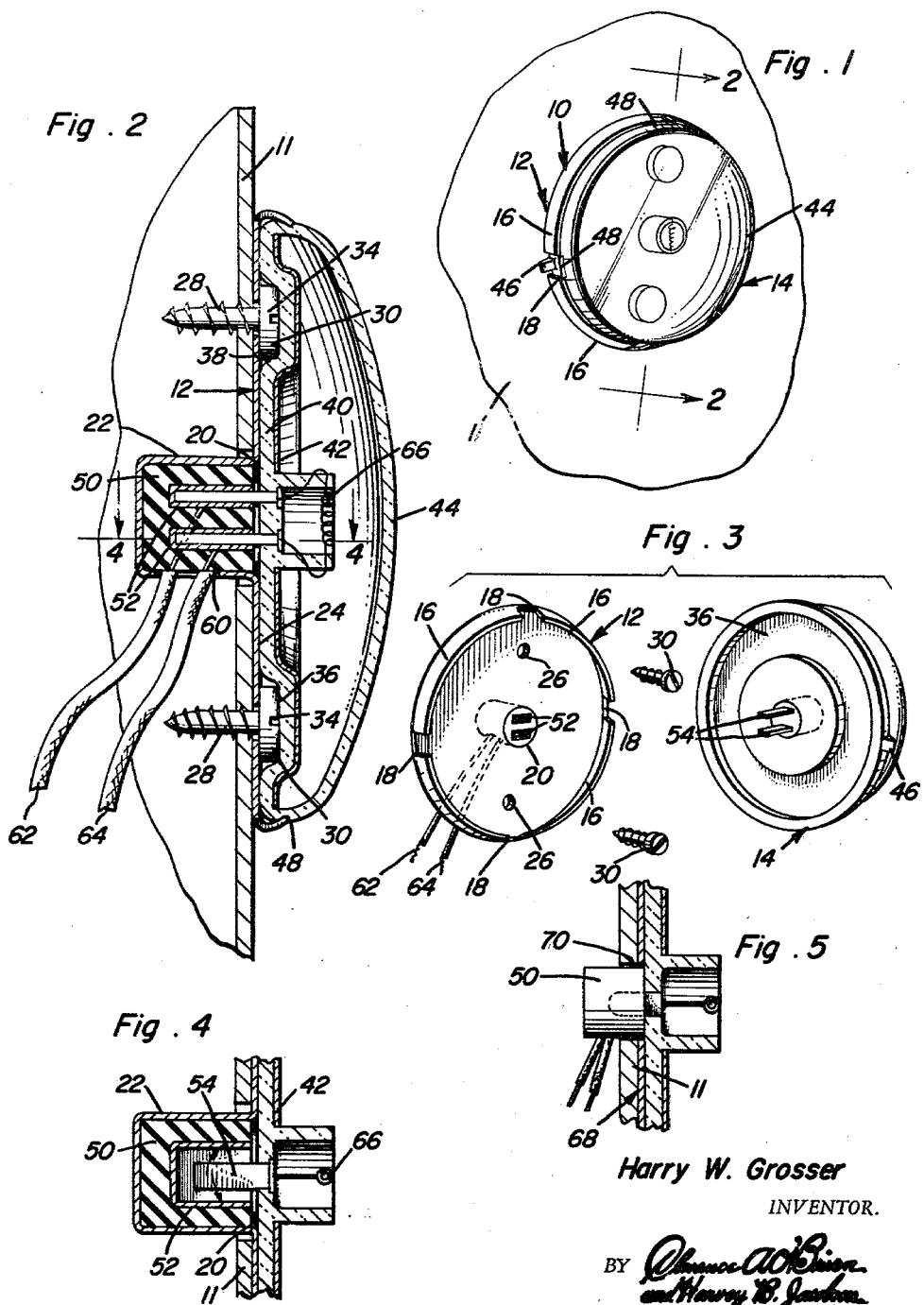

3,196,266
TRUCK CLEARANCE LIGHT
Harry W. Grosser, Jamestown, N.Y., assignor of one-half to Stanley A. Weeks, Jamestown, N.Y.
Filed Nov. 28, 1962, Ser. No. 240,685
12 Claims. (Cl. 240—8.2)

The present invention relates to a novel one-piece glass truck clearance light and more specifically to novel improvements in truck clearance lights and more specifically to an innovation to provide several times the life-hours expectancy, compared with lights commonly used for similar purposes, this in addition to its being an improved truck clearance light construction that will enable truck clearance lights to be more readily mounted on truck bodies and more readily replaced when replacement is needed.

In recent years, there has been increased usage of sealed lamp and lens assemblies. These sealed glass lamp and lens assemblies are appreciably less expensive to manufacture than assemblies including individual lamps and multi-piece lamp mounts and lens. In addition, they may be more readily changed and there is no danger of water getting behind the lens of the assembly. Still further, conventional clearance light assemblies which utilize a separate lens are susceptible to dirt as well as water getting behind the lens and appreciably reducing the light output of the assembly. When changing the lamp of a conventional clearance light utilizing a separate lens, the lens must be removed before the lamp may be changed and there are many difficulties which may be encountered when changing conventional clearance light lamps which can result in breakage of the separate lens unit. In this instance, unless maintenance men are very careful, a conventional clearance light assembly can be more expensive to operate and maintain than the more desirable sealed lamp and lens assembly.

It is accordingly the main object of this invention to provide an improved means for mounting sealed lamp and lens assemblies on truck bodies.

Still another object of this invention, is to provide a mounting for sealed lamp and lens assemblies including features which greatly facilitate the replacement of the sealed lamp and lens assemblies.

A final object of this invention to be specifically enumerated herein is to provide a truck clearance light in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawing forming a part hereof, wherein like numerals refer to like parts throughout.

FIGURE 1 is a perspective view of the clearance light of the instant invention shown mounted on a portion of a truck body;

FIGURE 2 is an enlarged vertical sectional view taken substantially above a plane indicated by the section line 2—2 of FIGURE 1;

FIGURE 3 is an exploded perspective view of the lamp assembly illustrated in FIGURE 1;

FIGURE 4 is a fragmentary horizontal sectional view taken substantially above the plane indicated by section line 4—4 of FIGURE 2;

FIGURE 5 is a fragmentary horizontal sectional view similar to that of FIGURE 4 but showing a modified form of lamp assembly.

Referring now more specifically to the drawings, the numeral 10 generally designates the truck clearance light of the instant invention which is shown in FIGURE 1 of the drawing mounted upon a portion of a truck body 11. The truck clearance light comprises a mounting plate generally referred to by the reference numeral 12 and a sealed lamp and lens assembly generally referred to by the reference numeral 14.

The mounting plate 12 includes a generally flat circular portion and a plurality of circumferentially extending laterally directed retaining flange portions 16 between adjacent ones of which are formed notches 18 which open toward the side of the mounting plate 12 to which the retaining flanges 16 project.

The mounting plate 12 has a centrally disposed opening 20 formed therein which is bound by the forwardmost portions of a socket defining member 22 which opens forwardly through the front face 24 of the mounting plate 12. The mounting plate 12 is also provided with a pair of apertures or openings 26 which are spaced substantially equidistant from the center of the plate 12 and which receive the shank portions 28 of headed fasteners 30 which are utilized to rigidly secure the mounting plate 12 in contact with the truck body 11 as more clearly shown in FIGURE 2. The heads 34 of the fasteners 30 are snugly received in a generally circular groove 36 formed in the rear face 38 of the rear wall 40 forming part of an enlarged lamp bulb or enclosure of the sealed lamp and lens assembly 14. If it is desired, a pair of arcuate grooves could be used in lieu of the single circular groove 36.

The front face of the rear wall 40 is covered with a light reflective covering or coating 42. The front lens wall of the assembly 14 may have any suitable optical configuration joined to the rear wall so as to enclose the filament 66 within a single chamber substantially equal in radial dimension to the circular portion of the mounting plate as seen in FIGURE 2. The front wall 44 may additionally be constructed of transparent material which has been tinted to the desired color.

The light and lens assembly 14 includes at least one generally radially projecting lug 46 which projects through and extends beyond a corresponding one of the notches 18 for angularly locking the lamp enclosure on the mounting plate seen in FIGURE 1 of the drawings.

With continued reference to FIGURE 2 of the drawings it will be noted that the free ends of the flanges 16 are inwardly convergent and that they are seated in an annular groove 48 formed about the periphery of the light and lens assembly 14. It is to be noted that the flanges or flange portions 16 are constructed of resilient or elastically deformable material and that they are normally biased to the positions illustrated in FIGURE 2 of the drawings.

A female socket member 50 is provided and is snugly received within the socket defining member 22. The socket member 50 defines a pair of generally parallel slot-like recesses 52 which are defined by conductive material while the remainder of the socket member is to be constructed of dielectric material and it will be noted that the slot-like recesses 52 open outwardly at one end of the socket member 50 and toward the lens and light assembly 14 for reception of the pair of generally parallel blade-like terminals 54 of the lens and light assembly 14. The blade-like terminals 54 are snugly receivable in the slot-like recesses 52 and it may be seen from FIGURE 4 of the drawings that the recesses 52 are each of a width greater than the width of the corresponding terminal 54. This will enable the terminals 54 to be oscillated in the direction illustrated by the arrow in FIGURE 4 of the drawings when a suitable implement is engaged behind the lug 46 to pry the lens and light assembly away from the mounting plate 12.

The socket defining member 22 has an opening 60 formed in one side thereof through which the conductors 62 and 64 which are connected to the conductive material defining the recesses 52 pass. The conductors 62 and 64 may of course be connected to a suitable source of electrical potential for causing light to be emitted from the incandescent resistance filament 66 which bridges the blade-like terminals 54 within the lamp and lens assembly 14.

With attention now directed to FIGURE 5 of the drawings there may be seen a modified form of mounting plate generally referred to by the reference numeral 68 and which is substantially identical to the mounting plate 12 with the exception that the socket defining member 22 has been omitted and the female socket member 50 therefore merely projects through the opening 70 formed in the truck body 11.

If it is desired, a suitable gasket may be interposed between the mounting plates 12 and 68 and the truck body 11. Further, although the mounting plate 12 and the light and lens assembly 14 have been described and illustrated herein as being generally circular in plan, they could be constructed having different plan shapes if desired. Still further, the assembly 14 may have a controlled filament life and is to be constructed of glass in order that it will be impervious to water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A truck clearance light for mounting on a truck body, said light comprising a mounting plate having a flat portion adapted to be secured to a supporting surface, said mounting plate including peripheral retaining flange portions projecting from said flat portion of said plate to define a recess, a sealed lamp and lens assembly snugly receivable within the recess for rigid mounting by said retaining flange portions in contact with the flat portion, said flange portions being elastically deflected from positions converging inwardly toward the center of said flat portion of the plate to embracingly engage the peripheral portions of said assembly and seat the assembly in said recess, said peripheral flange portions defining at least one notch opening outwardly, and said assembly including at least one lug projecting outwardly through said notch.

2. The combination of claim 1 wherein said flange portions define a plurality of notches spaced circumferentially about said plate, said plate having at least one pair of apertures formed therein spaced generally equidistant from the approximate center of said plate and adapted to receive therethrough the shank portions of headed fasteners, said lamp and lens assembly including a rear wall disposed in opposing relation with said flat portion of said plate, said rear wall having a circular groove formed therein adapted to receive the heads of said headed fasteners.

3. The combination of claim 2 wherein the inner surface of said rear wall has a light reflective coating thereon.

4. A truck clearance light for mounting on a truck body, said light comprising a mounting plate having a flat portion adapted to be secured to a supporting surface, said mounting plate including peripheral retaining flange portions projecting from said flat portion of said plate to define a recess, a sealed lamp and lens assembly snugly receivable within the recess for rigid mounting by said retaining flange portions in contact with the flat portion, said flange portions being elastically deflected from positions converging inwardly toward the center of said flat portion of the plate to embracingly engage the peripheral portions of said assembly and seat the assembly in said recess, said peripheral flange portions defining at least one notch opening outwardly, and said assembly including at least one lug projecting outwardly through said notch, said mounting plate defining a centrally disposed opening with the flat portion, a female socket member received in said opening including means defining a pair of generally parallel slot-like recesses opening outwardly at one end thereof, said lamp and lens assembly including a pair of generally parallel blade-like terminals disposed generally normal to the medial plane of said plate and snugly removably received in said recesses.

5. A truck clearance light for mounting on a truck body, said light comprising a mounting plate adapted to be secured to a supporting surface, said mounting plate including resilient peripheral retaining flange portions projecting laterally outwardly from one side of said plate, a sealed lamp and lens assembly snugly receivable within the recess bound by said retaining flange portions and removably secured in said recess by the outer free end portions of said flange portions which are normally biased slightly inwardly toward the center of said plate and embracingly engage the peripheral portions of said assembly when the latter is seated in said recess, said peripheral flange portions defining at least one notch opening outwardly toward said one side of said plate, and said assembly including at least one outwardly projecting lug projecting through said notch and outwardly beyond the adjacent portions of said retaining flange portions, said mounting plate defining a centrally disposed opening, a female socket member receivable in said opening including means defining a pair of generally parallel slot-like recesses opening outwardly one end thereof, said lamp and lens assembly including a pair of generally parallel blade-like terminals disposed generally normal to the medial plane of said plate and snugly removably received in said recesses, said recesses of said female socket member being of a greater width than the width of said terminals and said lug including portions disposed in an area falling between the medial planes of said terminals.

6. The combination of claim 5 wherein said plate and said assembly are generally circular in plan.

7. The combination of claim 6 wherein said flange portions define a plurality of notches spaced circumferentially about said plate, said plate having at least one pair of apertures formed therein spaced generally equidistant from the approximate center of said plate and adapted to receive therethrough the shank portions of headed fasteners, said lamp and lens assembly including a rear wall disposed in opposing relation with said one side of said plate, said rear wall having an outwardly opening generally circular groove formed therein adapted to receive the heads of said headed fasteners.

8. In combination with a flat supporting surface having an opening therein, a lamp assembly comprising, a mounting member in contact with said supporting surface having a socket portion aligned with the opening, fasteners securing said mounting member to the supporting surface, a sealed lamp enclosure having a rear wall in contact with the mounting member and covering the socket portion thereof and a front lens wall peripherally joined to the rear wall, a filament support connected to said rear wall and projecting into said lamp enclosure for mounting a filament therein, conductive prongs connected to the filament and projecting from the rear wall into the opening in the supporting surface and being received in said socket portion, retaining means connected to the mounting member radially beyond the fasteners for peripherally engaging the lamp enclosure at the juncture of the rear wall and the front lens wall and lug means connected to the lamp enclosure at said juncture radially projecting through the retaining means for exposure against the supporting surface.

9. In combination with a flat supporting surface having an opening therein, a lamp assembly comprising a mounting member in contact with said supporting surface having a socket portion aligned with the opening, fasteners securing said mounting member to the supporting surface, said fasteners having head portions projecting from the mounting member in radially spaced relation to the socket portion thereof, a sealed lamp enclosure having a rear wall in contact with the mounting member and covering the socket portion thereof and a front lens wall peripherally joined to the rear wall, said rear wall being formed with an arcuate groove receiving the head portions of the fasteners therein, a reflective coating on said rear wall, a filament support connected to said rear wall and projecting into said lamp enclosure for mounting a filament therein, conductive prongs connected to the filament and projecting from the rear wall into the opening in the supporting surface and being received in said socket portion, retaining means connected to the mounting member radially beyond the groove in the rear wall for peripherally engaging the lamp enclosure at the juncture of the rear wall and the front lens wall, and angular positioning means radially projecting from the lamp enclosure at said juncture for reception by the retaining means, said retaining means comprising a plurality of peripherally spaced flanges elastically deflected from positions converging radially inwardly by engagement with the lamp enclosure, said angular positioning means being received between adjacent spaced flanges.

10. In combination with a flat supporting surface having an opening therein, a lamp assembly comprising, a flat mounting member having a socket portion projecting into said opening, means rigidly securing said mounting member in contact with the supporting surface, a lamp bulb enclosing a single sealed chamber substantially equal in radial dimension to said mounting member, elastically deflected retaining means peripherally connected to the mounting member for holding the lamp bulb in contact with the mounting member closing the socket portion thereof, a filament mounted by said lamp bulb and enclosed solely by said chamber, conductive prongs connected to said filament and projecting from the lamp bulb into the opening in the supporting surface and being received in said socket portion and peripherally exposed lug means connected to the lamp bulb and projecting radially through the retaining means to angularly lock the lamp bulb on the mounting member and enable removal thereof from the mounting member.

11. The combination of claim 10 wherein said retaining means comprises a plurality of peripherally spaced flanges elastically deflected from positions converging radially inwardly by engagement with the lamp bulb, said lug means extending between and radially beyond the flanges, whereby the lamp bulb may be pried loose from the flanges by an implement inserted between the lug means and the supporting surface.

12. In combination with a supporting surface having an opening, a lamp assembly comprising, a mounting member rigidly secured to the supporting surface, a lamp bulb having prongs rearwardly projecting therefrom into the opening, socket means fixedly secured in said opening for receiving said prongs in a predetermined angular position, of the lamp bulb, said prongs being formed as parallel blade elements to prevent pivotal displacement of the lamp bulb away from the mounting member in all but one pivotal direction, retaining flange means connected to the mounting member for yieldably holding the lamp bulb in contact with the mounting member, and exposed means radially rigidly connected to the lamp bulb and projecting therefrom through the retaining flange means along said one pivotal direction adjacent to said supporting surface, whereby the lamp bulb is locked against angular displacement from said predetermined position, and said exposed means may be displaced away from the supporting surface in said one pivotal direction to remove the lamp bulb from the retaining flange means.

References Cited by the Examiner

UNITED STATES PATENTS

| | | | |
|---|---|---|---|
| 2,806,940 | 9/57 | Worden | 240—8.2 X |
| 2,826,680 | 3/58 | Cline | 240—8.16 |
| 2,853,595 | 9/58 | Baldwin | 240—8.2 |
| 2,903,570 | 9/59 | Worden | 240—7.1 |
| 2,965,750 | 12/60 | Baldwin | 240—8.2 |
| 3,065,340 | 11/62 | Mead et al. | 240—41.5 |
| 3,089,951 | 5/63 | Baldwin | 240—7.1 |

NORTON ANSHER, *Primary Examiner.*